United States Patent
Sarkar et al.

(10) Patent No.: US 8,346,250 B1
(45) Date of Patent: Jan. 1, 2013

(54) METHOD AND SYSTEM FOR ENHANCED SIMULTANEOUS HYBRID DUAL RECEIVE SWITCHING

(75) Inventors: Debasish Sarkar, Irvine, CA (US); Sachin R. Vargantwar, Overland Park, KS (US); Siddharth S. Oroskar, Overland Park, KS (US); Deveshkumar Rai, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 984 days.

(21) Appl. No.: 12/248,943

(22) Filed: Oct. 10, 2008

(51) Int. Cl.
*H04W 4/00* (2009.01)

(52) U.S. Cl. ............... 455/434; 455/552.1; 455/515; 455/516; 455/458; 455/455

(58) Field of Classification Search ............ 455/434, 455/455, 552.1, 553, 516, 515, 63.4, 458, 455/464; 370/328, 338, 334, 332, 310
See application file for complete search history.

(56) References Cited

U.S. PATENT DOCUMENTS

| | | | |
|---|---|---|---|
| 6,285,861 B1 | 9/2001 | Bonaccorso et al. | |
| 6,738,373 B2 | 5/2004 | Turner | |
| 6,804,532 B1 * | 10/2004 | Moon et al. | 455/552.1 |
| 7,821,988 B1 * | 10/2010 | Gunasekara et al. | 370/328 |
| 7,916,715 B2 | 3/2011 | Rezaiifar et al. | |
| 7,933,602 B1 * | 4/2011 | Balakrishnan et al. | 455/437 |
| 2003/0087680 A1 * | 5/2003 | Kim | 455/574 |
| 2006/0209801 A1 * | 9/2006 | Joshi et al. | 370/352 |
| 2007/0129020 A1 * | 6/2007 | Anton-Becker | 455/78 |
| 2008/0013488 A1 | 1/2008 | Garg et al. | |
| 2008/0117876 A1 * | 5/2008 | Hidaka et al. | 370/331 |
| 2009/0137267 A1 * | 5/2009 | Nader et al. | 455/552.1 |
| 2011/0176448 A1 | 7/2011 | Rezaiifar et al. | |

OTHER PUBLICATIONS

U.S. Appl. No. 12/368,323, entitled "Enhanced Simultaneous Hybrid Dual Receive Switching" filed Feb. 10, 2009 in the name of Debasish Sarkar et al.
Office Action in U.S. Appl. No. 12/368,323 mailed Sep. 30, 2011.

* cited by examiner

*Primary Examiner* — Kathy Wang-Hurst (57) ABSTRACT

A method and system is disclosed for enhanced Simultaneous Hybrid Dual Receive operation. A hybrid access terminal engaged in an IS-856 data communication in a hybrid IS-2000/IS-856 wireless communication system will use its high-gain antenna to conduct IS-2000 tuneaway scans when the access terminal determines that the IS-2000 signal received from its serving base station is below a level that can be reliably detected by its low-gain antenna. At the same time, the access terminal will continue to use its low-gain antenna to engage in the ongoing IS-856 communication, thereby avoiding interruption of the IS-856 communication by IS-2000 tuneaway scans, even when RF conditions are suboptimal. The access terminal may apply a DRC offset to its DRC request when using just its low-gain antenna for IS-856 communications.

17 Claims, 6 Drawing Sheets

METHOD AND SYSTEM FOR ENHANCED SIMULTANEOUS HYBRID DUAL RECEIVE SWITCHING

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol within a single system. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, for instance (hereafter "IS-856"). In such a "hybrid system," an access terminal might not only hand off between coverage areas under a common air interface protocol (e.g., between IS-2000 sectors) but may also hand off between the different air interface protocols, such as between IS-2000 and IS-856. An access terminal capable of communicating on multiple air interface protocols of a hybrid system is referred to as a "hybrid access terminal." Handoff between different air interface protocols (or, more generally, between different access technologies) is known as "vertical" handoff.

SUMMARY

When a hybrid access terminal operates in a hybrid wireless communication system, such as a hybrid IS-2000/IS-856 system, and in particular when such a terminal is engaged in an active IS-856 data communication, it will periodically scan the IS-2000 air interface for IS-2000 communications. More specifically, the hybrid AT will scan an IS-2000 paging channel (as well as other IS-2000 control channels) for any page messages or other IS-2000 alerts or messages. Because the IS-2000 interface and the IS-856 interface use different RF frequencies, the hybrid AT must tune to the IS-2000 interface (and away from the IS-856 interface) in order to conduct the scan. Such "tuneaway scans" can interrupt the ongoing IS-856 communication session, thereby reducing data throughput. In order to help reduce the impact of tuneaway scans, newer-generation hybrid ATs have two antennas—a high-gain (primary) antenna and a low-gain (secondary antenna)—that may be simultaneously tuned to the same or different RF frequencies, thus facilitating so-called "Simultaneous Hybrid Dual Receive" ("SHDR") mode or operation.

In practice, a SHDR-capable access terminal will tune both antennas to the IS-856 air interface to engage in an IS-856 communication, and use just the low-gain antenna for periodic tuneaway scans on the IS-2000 interface. In so doing, the IS-856 communication remains continuous, even during tuneaway scans. However, if signal received by the AT on the IS-2000 interface is too weak to be reliably detected by the low-gain antenna (e.g., owing to the AT's location in the serving sector), then the AT will revert to "legacy hybrid mode," in which both antennas tune away to the IS-2000 air interface during the periodic tuneaway scans. In this mode of operation, the IS-856 communication is again interrupted during IS-2000 scans.

Accordingly, embodiments of the present invention provide a method and system for a mode of SHDR operation that supports IS-856 communications uninterrupted by IS-2000 tuneaway scans, even when RF conditions are poor or suboptimal. More particularly, a method and system is disclosed for "enhanced SHDR" operation in which the AT's secondary antenna is used for tuneaway scans when RF conditions are sufficiently good, and the AT's primary antenna is used for tuneaway scans when RF conditions are not sufficiently good. Enhanced SHDR operation thereby facilitates higher data throughput during IS-856 communications with an AT than does conventional SHDR operation.

Hence, in one respect, various embodiments of the present invention provide, in an access terminal having at least a first antenna and a second antenna, a method comprising: using both the first antenna and the second antenna in combination to engage in a first air interface protocol communication; engaging in periodic intervals of scanning for communication on a second air interface protocol; prior to a next periodic interval, determining air interface quality on the second air interface protocol; using the determined air interface quality as a basis to select one antenna from the first antenna and the second antenna; and using the selected antenna, and not the other antenna, for scanning for communication on the second air interface protocol in the next periodic interval.

In another respect, various embodiments of the present invention provide, in an access terminal that has at least a high-gain antenna and a low-gain antenna, and that operates according to at least 1X-RTT and EVDO in a wireless communication system, a method comprising: using both the high-gain antenna and the low-gain antenna in combination to engage in an EVDO communication with a base station in the wireless communication system; engaging in periodic intervals of scanning for communication on a 1X-RTT interface; prior to a next periodic interval, determining air interface quality on the 1X-RTT interface; using the determined air interface quality as a basis to select one antenna from the high-gain antenna and the low-gain antenna; and using the selected antenna, and not the other antenna, for scanning for communication on the 1X-RTT interface in the next periodic interval.

In still another respect, various embodiments of the present invention provide, in an access terminal that has at least a high-gain antenna and a low-gain antenna, and that operates according to at least 1X-RTT and EVDO in a wireless communication system, an improvement comprising: means for using both the high-gain antenna and the low-gain antenna in combination to engage in an EVDO communication with a base station in the wireless communication system; means for engaging in periodic intervals of scanning for communication on a 1X-RTT interface; means for determining, prior to a next periodic interval, air interface quality on the 1X-RTT interface; means for using the determined air interface quality as a basis to select one antenna from the high-gain antenna and the low-gain antenna; and means for using the selected antenna, and not the other antenna, for scanning for communication on the 1X-RTT interface in the next periodic interval.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
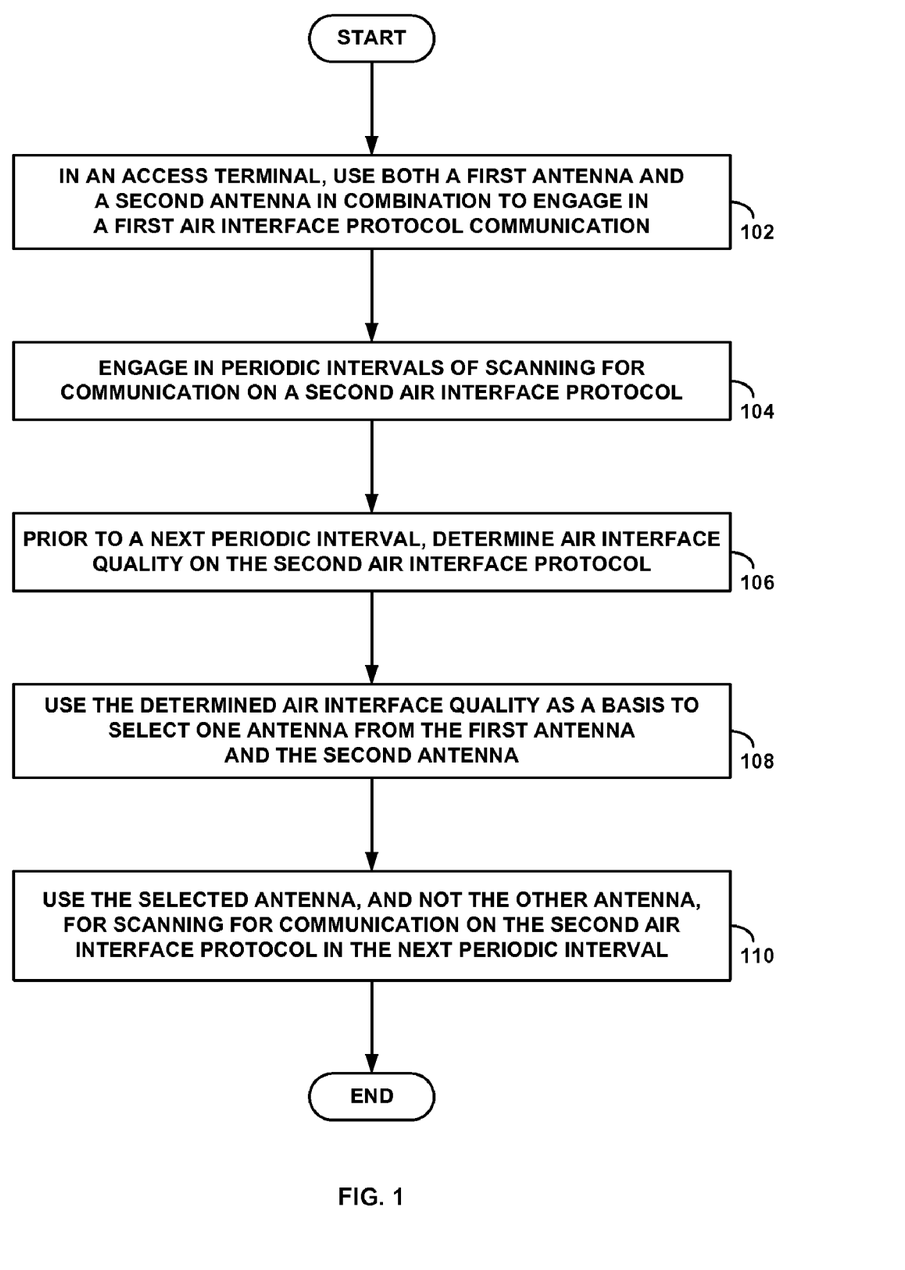
FIG. 1 is a flowchart depicting an example embodiment of enhanced SHDR operation.

FIG. 1 is a flowchart depicting an example embodiment of enhanced Simultaneous Hybrid Dual Receive (SHDR) operation. By way of example, the steps of the flowchart could be implemented in an access terminal capable of simultaneously communicating on two interface protocols, such as IS-2000 and IS-856 in a wireless communication system that operates according to a CDMA family of protocols. Such an access terminal is referred to as a "hybrid" access terminal. At step 102, an access terminal uses both a first antenna and a second antenna in combination to engage in a communication on a first air interface protocol. In an example embodiment, the first antenna is a high-gain antenna, the second antenna is a low-gain antenna, and the first air interface protocol is IS-856. As such the first communication could be an EVDO data session or other EVDO-based communication or session.

At step 104, the AT engages in periodic intervals of scanning for communication on a second air interface protocol. In accordance with the example embodiment, the second air interface protocol could be IS-2000, whereby the AT could be scanning for a 1X-RTT communication. More specifically, the AT could be scanning for a 1X-based page message on a 1X paging channel, or a message on another 1X control channel. As described in detail below, scanning the 1X interface could involve the AT tuning one or another of its antennas to the 1X interface and away from the EVDO interface.

Prior to a next periodic interval, the AT determines air interface quality on the second air interface protocol, as indicated at step 106. In further accordance with the example embodiment, the AT may measure the signal level or some other metric indicative of quality on the 1X interface during a current periodic interval, and then use the measurement to determine or predict air interface quality on the 1X interface during the next, upcoming periodic interval. Alternatively, the AT could compute a running average of signal level (or other metric) on the 1X interface, and use the computed average to determine or predict air interface quality on one or more upcoming periodic intervals. Other methods of determining air interface quality during the next periodic interval are possible as well.

At step 108, the AT uses the determined air interface quality as a basis to select one antenna from the first and second antennas. For instance, the determined air interface quality could be used to determine which of the two antennas is best suited to reliably receive communication on one or the other of the two air interface protocols. In keeping with the example embodiment, the low-gain antenna could be selected for scanning the 1X interface if the signal level determined at step 106 is sufficiently strong to be reliably detected by the low-gain antenna. Conversely, if the signal level is below a threshold level, indicating that the signal is too weak to be reliably detected by the low-gain antenna, then the high-gain antenna could instead be selected for scanning the 1X interface for 1X-based communication.

Finally, at step 110, the selected antenna, and not the other antenna, is used by the AT to scan the second air interface protocol in the next period interval. In still further accordance with the example embodiment, the low-gain antenna could be used to scan the 1X interface for 1X communication if the low-gain antenna had been selected at step 106. Conversely, the high-gain antenna could be used to scan the 1X interface for 1X communication if the high-gain antenna had been selected at step 106. Moreover, the AT could advantageously keep the antenna that is not selected to scan the 1X interface tuned to the EVDO interface, thereby maintaining the EVDO communication without interruption by scanning the 1X interface. Additionally, if the high-gain antenna is selected to scan the 1X interface while the low-gain antenna is kept tuned to the DO interface and alone (i.e., without the high-gain antenna) continues to receive the EVDO communication, the AT could determine if the current data rate requested by the AT on its forward link from the base station is above a threshold rate. If so, then the AT could request a reduced rate, so as to help ensure that the low-gain antenna will be able to reliably detect the EVDO communication and that the AT can decode the received signal.

It will be appreciated that the steps of FIG. 1 are illustrated by way of example, and that additional and/or alternative steps or alternative ordering of steps could be carried in order to achieve enhanced SHDR operation. Further details related to some of the steps shown in FIG. 1 are discussed below.

Figure 2:
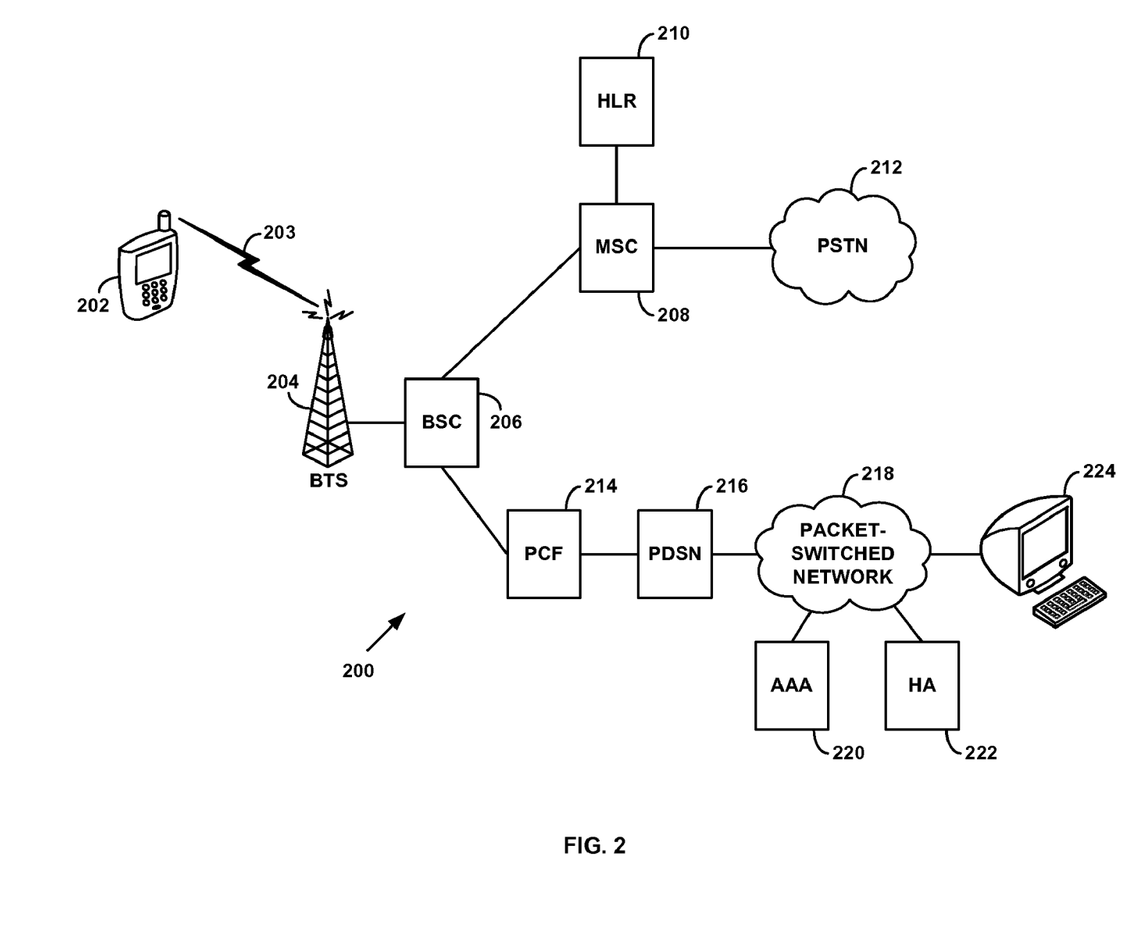
FIG. 2 is a simplified block diagram of a wireless communication system in which an example embodiment of enhanced SHDR operation could be carried out.

FIG. 2 shows a simplified block diagram of a wireless communication system 200 in which an exemplary embodiment of enhance SHDR operation can be employed. Access terminal AT 202 communicates over an air interface 203 with a BTS 204, which is then coupled or integrated with a BSC 206. Transmissions over air interface 203 from BTS 204 to AT 202 represent the forward link to the access terminal, while transmissions over interface 203 from AT 202 to BTS 204 represent the reverse link.

BSC 206 is connected to MSC 208, which acts to control assignment of air traffic channels (e.g., over air interface 203), and provides access to wireless circuit-switched services such as circuit-voice and circuit-data (e.g., modem-based packet data) service. As represented by its connection to PSTN 212, MSC 208 is also coupled with one or more other MSCs or other telephony circuit switches in the operator's (or in a different operator's) network, thereby supporting user mobility across MSC regions, and local and long-distance landline telephone services. Also connected to MSC 208 is home location register (HLR) 210, which supports mobility-related aspects of subscriber services, including dynamic tracking of subscriber registration location and verification of service privileges.

As shown, BSC 206 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over its air interface, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a communication interface, a tone detector, a processing unit, and data storage, all of which may be coupled together by a system bus or other mechanism.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CONVENTIONAL CDMA COMMUNICATIONS

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

With the arrangement described above, an access terminal can engage in cellular voice and/or in packet-data (1X-RTT) communications. Referring again to FIG. 2, and taking an originating call from AT 202 as an example, AT 202 first sends an origination request over air interface 203 and via the BTS 204 and BSC 206 to MSC 208. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session, the BSC signals to the PDSN 216 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

An access terminal that has no active data session or voice call (i.e., no assigned traffic channel), but is otherwise operational in an IS-2000 system, is said to be in an "idle" state or mode. While in the idle state, the access terminal periodically scans the 1X interface for communication from the wireless communication system. More specifically, the AT monitors the paging channel for page messages from the base station. Page messages are used to send the access terminal information, alerts, and requests during times when the AT isn't engaged in any 1X-based communication (i.e., when the AT is idle). For instance, the AT is alerted of an incoming call via a page message.

In practice, a wireless communication system implements multiple paging channels (typically, up to seven), each subdivided into 2,048 periodically recurring, 80-millisecond (ms) slots. In order to help conserve AT battery power, an AT in the idle state monitors only certain assigned slots on a given paging channel. More specifically, an AT's assigned slots recur according to a "slot cycle" having a sub-period within the 2,048-slot "maximum slot cycle" period (163.84 seconds). The sub-period (slot cycle) is set according to a system parameter called the "slot cycle index." For instance, slot cycle index values of 0, 1, and 2 define slot cycles of 1.28, 2.56, and 5.12 seconds, respectively, corresponding to recurrence every 16, 32, and 64 slots per maximum slot cycle. Within the maximum slot cycle, the phase of an AT's slots is determined according to a "hashing function" that effectively randomizes the phases of all ATs such that, on average, no one slot is assigned to more ATs than any other slot.

During each of an AT's slots, it will scan the 1X paging channel for any possible messages (pages). The duration of the scan is typically 80-120 ms, although longer scans are possible depending on whether a message has been sent, the length of the message, and the RF conditions on the AT's forward link, among other factors.

2. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM), in order to transmit to only one access terminal at a time, but at the full power of the sector. The reverse link under IS-856 retains largely the traditional IS-2000 code division multiplexing (CDM) format, albeit with the addition of a "data rate control" (DRC) channel used by the AT to indicate the supportable data rate and best serving sector for the forward link. As a result of the full-power allocation by the sector, an access terminal operating under IS-856 can, in theory, receive packet-data at a rate of at least 38.4 kbps and up to 2.4 Mbps.

The IS-856 forward link is divided into time slots of length 2048 chips, and each time slot is further time division multiplexed to carry various channels, including a pilot channel, a Medium Access Control (MAC) channel, and, if any traffic exists, a forward traffic channel and a "control" channel. The pilot and MAC channels are together allocated 224 chips twice per time slot (a total of 448 chips) at pre-assigned positions within each time slot (i.e., at pre-assigned phases of each slot). The remaining chips are allocated for forward traffic ("data chips") or control. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Operation in an IS-856 compliant communication system may be illustrated, again with reference to FIG. 2. To acquire an EVDO packet data connection, after an access terminal first detects an IS-856 carrier, the access terminal sends to its BSC (or RNC) 206 a UATI (Universal Access Terminal Identifier) request, and receives in response an UATI, which the access terminal can then use to identify itself in subsequent communications with the BSC. The access terminal then sends a connection-request to the BSC 206, and the BSC responsively invokes a process to authenticate the access terminal and to have the access terminal acquire a data link.

In particular, the BSC 206 sends an access request to an Access Network AAA (ANAAA) server (which may be different than the AAA server 220), and the ANAAA server authenticates the access terminal. The BSC 206 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 216 (via PCF 214), and the PDSN and access terminal then negotiate to establish a PPP data link. In addition, as in the IS-2000 process, the access terminal then sends an MIP RRQ to the PDSN, which the PDSN forwards to the HA 222, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal to noise ratio, thus facilitating higher rate data communication than the power-limited CDMA channels. Upon termination of the AT's EVDO session, the AT returns to an idle or dormant mode of operation.

3. HYBRID IS-2000/IS-856 SYSTEMS

Given the proliferation of legacy IS-2000 systems, IS-856 was designed to be backwards compatible and to facilitate "hybrid" operation. In this scenario, a hybrid access terminal that can operate on both IS-2000 and IS-856 networks is required. A typical hybrid AT, for instance, may be capable of receiving voice, short message service (SMS) messages, and dedicated channel data services on IS-2000 networks, as well as high-speed packet data service on IS-856 networks. Note that a hybrid system could support additional or alternative air interface protocols, in which case, a hybrid AT might also be capable of operation under these additional or alternative protocols.

In a hybrid system, IS-2000 and IS-856 coverage are provided on different carrier frequencies, each of which is 1.25 MHz in bandwidth for consistency with legacy operation. Further, most IS-856 systems are provided as overlays on existing IS-2000 systems, such that a given BSC provides either IS-2000 coverage or both IS-2000 and IS-856 coverage. For an IS-2000 sector, the BSC may have just an IS-2000 circuit card. For a hybrid IS-2000/IS-856 sector, on the other hand, the BSC may have both an IS-2000 circuit card to facilitate IS-2000 operation and an IS-856 circuit card to facilitate IS-856 operation. A typical hybrid AT will be programmed to use an EVDO data connection when faced with the choice between EVDO and 1X-RTT, i.e., when in a hybrid sector.

By standard design, when a hybrid AT is operating in an IS-856 system, it will also periodically monitor the control channels in the IS-2000 system, in search of any incoming voice calls, SMS messages, or the like, and to monitor IS-2000 pilot signals. In particular, in the active EVDO mode, the hybrid AT will continue monitor the 1X paging channel during its assigned slot cycles, as described above.

Further, because IS-856 is typically provided as an overlay on an existing IS-2000 system, it is possible that a hybrid terminal may need to hand off from a hybrid sector (providing both 1X-RTT and EVDO coverage) to an 1X-RTT sector (providing no EVDO coverage), e.g., as it moves physically out of a hybrid sector and into an IS-2000 sector. To be able to facilitate such a handoff, when a hybrid terminal is operating in IS-856 it will simultaneously maintain an IS-2000 active set as described above. In particular, as the hybrid AT periodically tunes to the IS-2000 frequency, it will monitor the IS-2000 pilots, report the signal strengths to the RAN, and update its active set under instruction from the RAN. Thus, when the terminal seeks to hand off from EVDO to 1X-RTT, the terminal can readily switch over to operating on one or more of the sectors currently in its IS-2000 active set.

4. ENHANCED SHDR ANTENNA SWITCHING a. Operating Principles

As described above, in conventional EVDO operation in a hybrid IS-2000/IS-856 system, a hybrid AT will periodically scan the 1X interface according to its slot cycle for 1X-based communications (e.g., page messages). During an active EVDO communication (i.e., data session) an AT has its antenna and receiver tuned the RF frequency of the EVDO interface. However, in order to scan the 1X interface according to its assigned slots, the AT must periodically tune to the RF frequency of the 1X interface and tune away from the EVDO interface for the duration of the scan interval. These slot-cycle scans, commonly referred to as "tuneaway scans," can have an impact on quality and throughput of EVDO communications. For example, a slot cycle index of 2 corresponds to a tuneaway scan every 5.12 s, or a roughly 2-4% interruption of an EVDO communication in terms of time (assuming 80-160 ms scans).

In order to help mitigate the impact of tuneaway scans and add diversity capabilities to access terminals, newer-generation hybrid ATs include two antennas—a primary antenna and a secondary antenna—that can be independently tuned to the same or different RF frequencies. The primary antenna has higher gain than the secondary antenna, and is therefore generally capable of detecting weaker received signals than the secondary antenna. Also referred to the "high-gain antenna," the primary antenna is associated with a primary transmit and receive chain designated by "TxRx0." The secondary antenna is also referred to as the "low-gain antenna," and is associated with a secondary transmit and received chain designated by "TxRx1."

The capability of both antennas to simultaneously receive signals at the same or different RF frequencies is what enables the AT to operate in Simultaneous Hybrid Dual Receive (SHDR) mode. In particular, an AT engaging in an active EVDO communication with both antennas in combination benefits from their combined gain, and can conduct tuneaway scans with just its secondary antenna while continuing its EVDO communication with its primary antenna. This mode of SHDR operation, referred to herein as "conventional SHDR" mode or operation, supports uninterrupted EVDO communications during tuneaway intervals, albeit at slightly reduced gain during those intervals.

As a hybrid AT moves about within and among sectors (or other forms of coverage areas), it may happen that the RF conditions degrade such that the low-gain antenna does not have sufficient sensitivity to reliably detect the 1X control channels (e.g., paging channel) during one or more tuneaway scans. Under conventional SHDR operation in such a circumstance, the AT reverts to "legacy hybrid mode," in which both antennas are used for tuneaway scans. The result is more reliable detection of the 1X control channels, but at the cost of reintroducing interruption of EVDO communications.

In practice, the determination of whether to apply conventional SHDR operation to tuneaway scans or to revert to legacy hybrid mode is based on the strength of the signal received by the AT on its 1X interface. More specifically, the AT determines which mode of tuneaway scan to perform for the next, upcoming slot cycle by comparing the received 1X signal level during the current slot cycle against a threshold signal level. If the received signal level is at least as high as the threshold level, then the AT uses conventional SHDR operation on its next tuneaway scan. If the received signal level is below the threshold level, then the AT uses legacy hybrid operation during the next scan.

Figure 3:
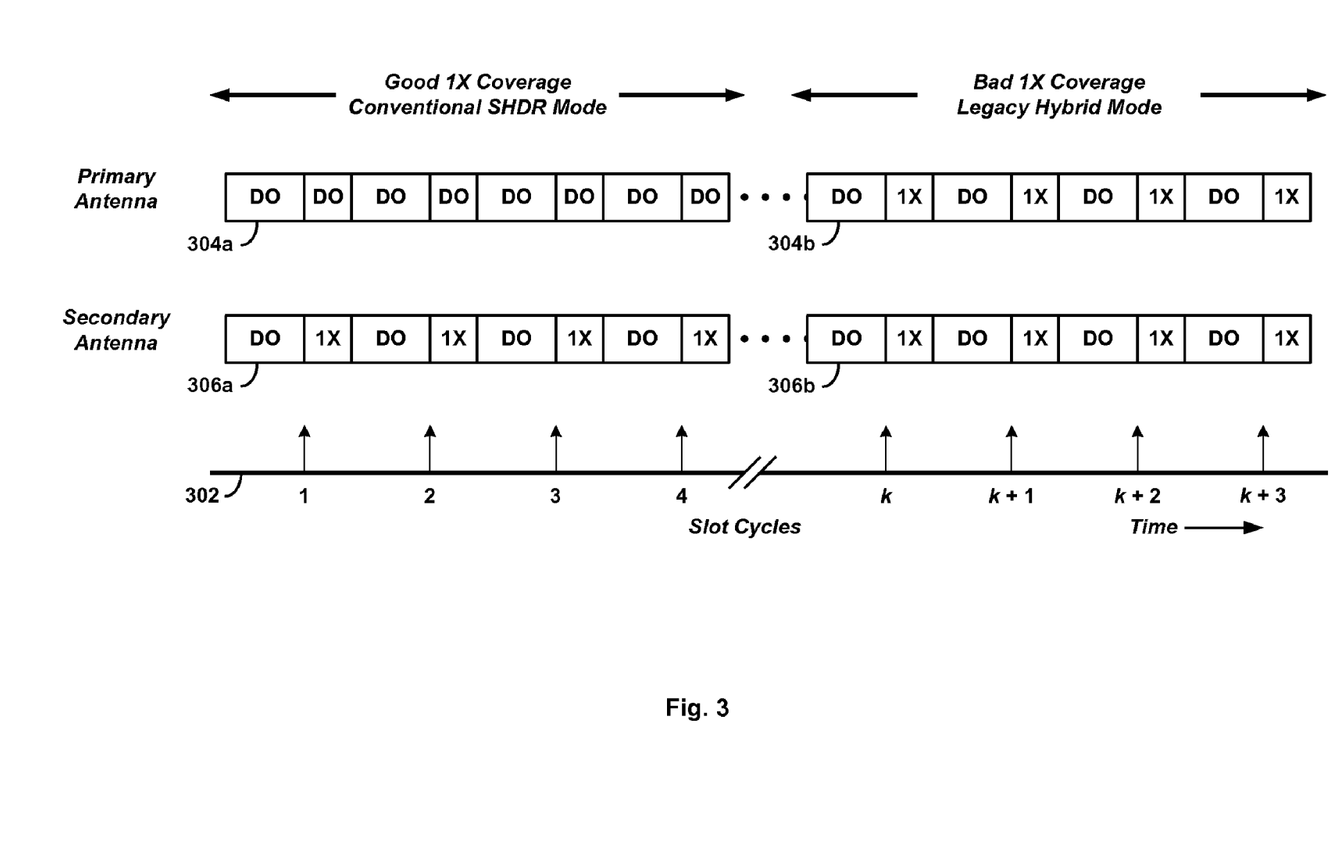
FIG. 3 illustrates the operating principles of conventional SHDR operation and legacy hybrid mode.

The operational principles just described are illustrated schematically in FIG. 3 for a given access terminal. At the bottom of the figure, timeline 302 indicates the slot cycles for the given AT, the start time of each scan being marked by an upward arrow (with time increasing towards the right, as shown). Each time is labeled with a number for the purposes of the discussion herein. Hatch marks at the midpoint of timeline 302 indicate an (arbitrary) gap between slot cycle times (1, 2, 3, 4) and (k, k+1, k+2, k+3).

Operation across slot cycles of the primary (high-gain) and secondary (low-gain) antennas is depicted by antenna-receive sequences 304(a, b) and 306(a, b), respectively. By way of example, during operation across slot cycle times 1, 2, 3, and 4, the AT is shown to have "good" 1X coverage (e.g., good RF conditions), while across slot cycle times k, k+1, k+2, and k+3 the AT has "bad" 1X coverage (e.g., poor RF conditions). The gap in the timeline noted above represents a time during which the 1X coverage evidently transitioned (in some manner) from good to bad.

As indicated by antenna-receive sequence 304a, the primary antenna remains tuned to the DO interface continuously, even during the AT's assigned slot cycles. This is indicated by the continuous train of boxes labeled "DO" that make up sequence 304a. In contrast, antenna-receive sequence 306a shows that the secondary antenna tunes to the 1X interface (and away from the DO interface) during tuneaway scans. This is indicated by the boxes labeled "1X" that interrupt the "DO" boxes at each slot cycle in sequence 306a. Thus sequence 304a represents a continuous EVDO communication (i.e., data session) via the primary antenna, uninterrupted by tuneaway scans, while sequence 306a represents the same EVDO communication via the secondary antenna, but with periodic 1X tuneaway interruptions at slot-cycle times.

Antenna-receive sequences 304b and 306b span a time during which the AT has bad 1X coverage, as indicated. For the purposes of the present discussion, "bad" 1X coverage corresponds to a received 1X signal level below a threshold level for reliable detection by the secondary (low-gain) antenna. In this case, the AT reverts backs to legacy hybrid mode in which both the primary and secondary antennas tune to the 1X interface (and away from the DO interface) during tuneaway scans. This is indicated by identical antenna-receive sequences for both antennas, both sequences showing the EVDO communication interrupted by 1X tuneaway scans. Thus, as described above, in circumstances of poor (or sub-optimal) RF conditions, uninterrupted EVDO communications may not be possible for an AT using conventional operation.

Accordingly, embodiments of the present invention introduce an enhanced SHDR mode of operation that advantageously enables a hybrid AT to engage in uninterrupted EVDO communications, even when operating under bad 1X coverage conditions. Specifically, a hybrid AT operating according enhanced SHDR mode will (i) use its low-gain antenna for 1X tuneaway scans while keeping its high-gain antenna tuned to the EVDO interface when 1X coverage is good, and (ii) use its high-gain antenna for 1X tuneaway scans while keeping its low-gain antenna tuned to the EVDO interface when 1X coverage is bad. Thus, instead of tuning both of its antennas away from the EVDO interface, the AT compensate for bad 1X coverage by employing its high-gain antenna on the 1X interface, while continuing its EVDO communications with it low-gain antenna. In this manner, the AT will advantageously retain the ability to engage in EVDO communications uninterrupted by 1X tuneaway scans, even when 1X coverage is bad.

Figure 4:
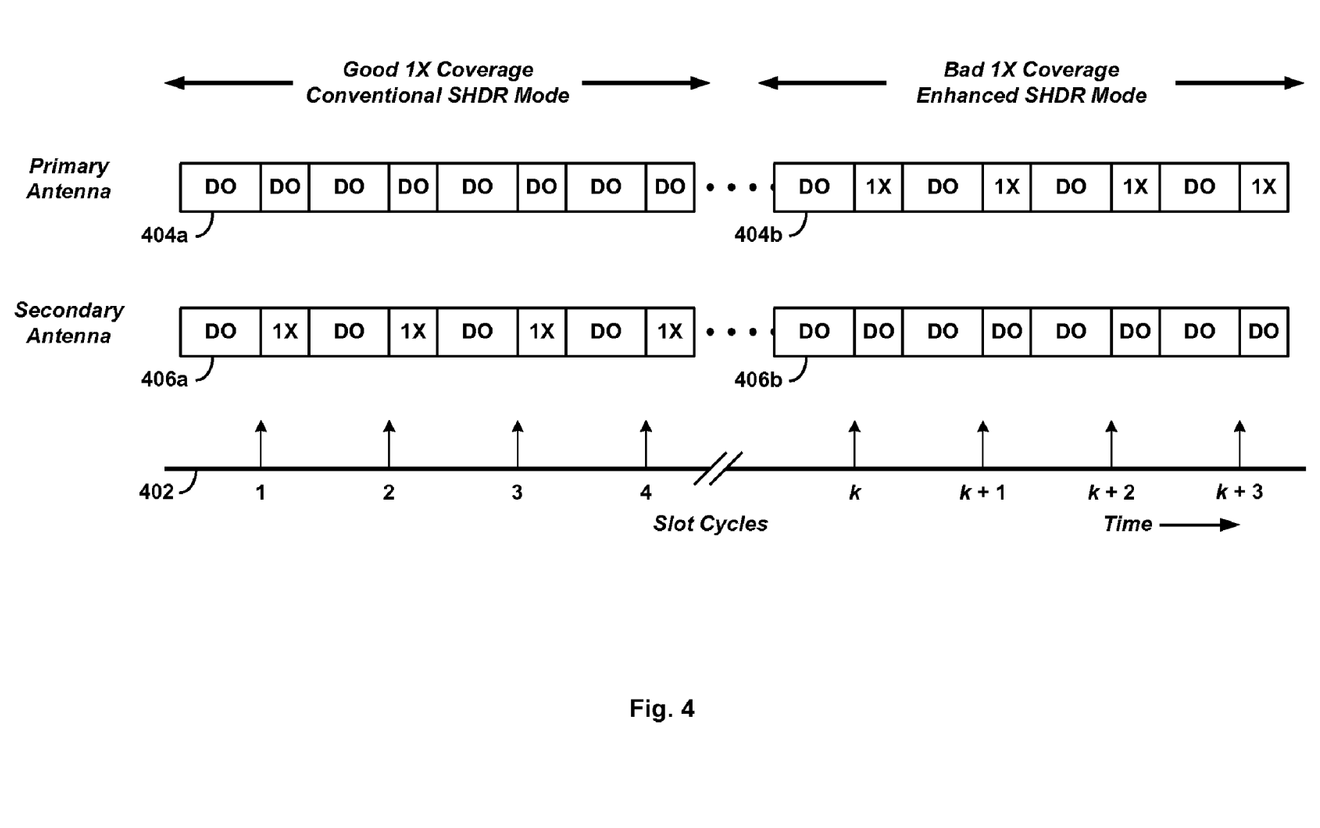
FIG. 4 illustrates the operating principles of enhanced SHDR operation.

The operating principles of enhanced SHDR mode are illustrated by way of example in FIG. 4, which, similarly to FIG. 3, includes timeline 402, and primary antenna-receive sequence 404(a, b) and secondary antenna-receive sequence 406 (a, b) for a hybrid AT. As with conventional SHDR mode, the hybrid AT's secondary antenna is used for 1X tuneaway scans when the AT has good 1X coverage (slot cycle times 1, 2, 3, and 4 in this example). This is illustrated in antenna-receive sequences 404a and 406a, which are (in this example) identical to antenna-receive sequences 304a and 306a in FIG. 3. However, in bad 1X coverage (slot cycle times k, k+1, k+2, and k+3 in this example), the hybrid AT uses its primary antenna for the tuneaway scan, while keeping its secondary antenna tuned to the EVDO interface. This is shown in antenna-receive sequences 404b and 406b, where the boxes labeled "1X" now interrupt the EVDO communications with the primary antenna (404b), while the boxes labeled "DO" are continuous for the secondary antenna (406b).

As with conventional SHDR mode, a determination of the signal level on the 1X interface can be made during a current 1X tuneaway scan, and then used to effectively predict the signal level on the next, upcoming tuneaway scan. In the case of enhanced SHDR operation, the prediction will be used to decide whether to use conventional SHDR mode on the next, upcoming tuneaway scan, or enhanced SHDR mode on the next scan. More particularly, if the received 1X signal level during a current scan is at least as high as a threshold level, then the AT will use conventional SHDR operation on its next tuneaway scan (in accordance with antenna-receive sequences 404a and 406a, for instance). If the received signal level is below the threshold level, then the AT will used enhanced SHDR operation during the next scan (in accordance with antenna-receive sequences 404b and 406b, for instance). In either case, the EVDO communication will not be interrupted by the tuneaway scan.

Note that the determination of signal level that is used to determine which SHDR mode to use is more generally a determination of air interface quality on the 1X interface. As such, alternative methods of determining the conditions under which the AT should use one or another of the SHDR modes could be applied. For example, measurement of the received 1X signal level could be made during a current tuneaway scan, and the comparison with a threshold made after the scan is complete. Further, the AT could keep a running average of received 1X signal levels from multiple scans, and apply the threshold comparison to the average. Other methods of determining and/or prediction signal level and/or air interface quality could be used as well.

An example embodiment of enhanced SHDR operation could be implemented on a hybrid access terminal, and made to function in accordance with the description above. Since a hybrid AT will advantageously use air interface quality (e.g., received 1X signal level compared to a threshold level) to determine which of the high-gain antenna and the low-gain antenna to use for tuneaway scans, enhanced operation may be considered as including antenna selection or antenna "switching" that is adjusted according to air interface conditions. Thus, although operation of the hybrid AT in good 1X coverage has be referred to above as "conventional SHDR" mode while operation in bad 1X coverage has been referred to as "enhanced SHDR" mode, the term "enhanced SHDR" mode (or operation) shall be extended herein to more generally signify both modes in combination with the decision logic used to select which of the high-gain and low-gain antenna to use for one or more upcoming tuneaway scans.

In further accordance with the example embodiment, if the hybrid AT determines that the high-gain (primary) antenna should be used for one or more upcoming tuneaway scans, and thus the low-gain (secondary) antenna will be used to continue ongoing EVDO communications, the AT will additionally determine if the current DRC request is above a threshold DRC value, and if so, will send a request with a reduced DRC to the serving base station. Specifically, if the AT will be using the low-gain antenna for EVDO communications during tuneaway scans, the AT will apply a DRC offset to the current DRC request if the current DRC is above the threshold value. In conventional operation under IS-856, the serving base station may apply a DRC offset to a DRC request received from an AT in order to help compensate for a possible over-estimation by the AT of its attainable forward-link data rate. The DRC offset is applied as a reduction to the AT's DRC request, causing the base station to use a lower forward-link data rate than that requested by the AT. In turn, the AT may more reliably decode its forward-link data from the base station.

In practice, the base station maintains a table of DRC offsets, and determines which to apply in any given instance. As applied to enhanced SHDR operation, the hybrid AT will similarly maintain a table of one or more DRC offsets, and apply a DRC offset to its own DRC request in the case that the current DRC request is above the threshold and the hybrid AT's secondary antenna will be used for EVDO communications during one or more tuneaway scans. In so doing, the AT will help compensate for its use of only its low-gain antenna to receive data on the EVDO interface during tuneaway scans. Use of the DRC threshold value will allow the AT to apply the DRC offset reduction only when current DRC request exceeds a data rate that the low-gain antenna is capable of reliably receiving. Note that conventional use of DRC offsets by the base station may still be retained.

5. IMPLEMENTATION OF EXAMPLE EMBODIMENT

The example embodiment of enhanced SHDR operation described above can be implemented as a method carried out on a hybrid access terminal or other communication device that operates according to IS-2000 and IS-856 in a similarly-compliant wireless communication system such as the one described above in connection with FIG. 2. The logical steps and operations of the method are described in the next subsection. Example means for carrying out the method are described in the subsequent subsection.

a. Example Method

Figure 5:
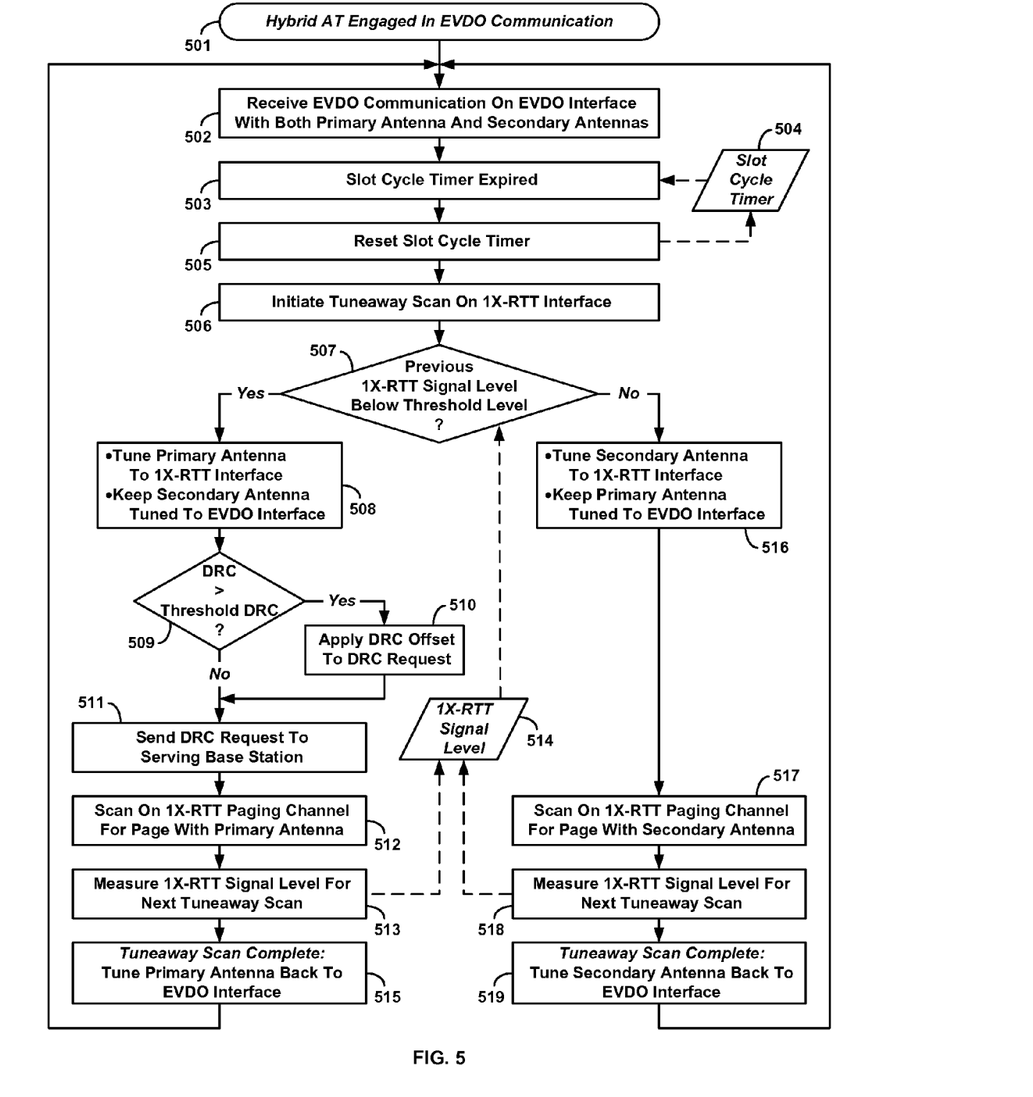
FIG. 5 is a flowchart depicting an example embodiment of the logical execution of enhanced SHDR operation in a device such as a hybrid access terminal.

FIG. 5 depicts enhanced SHDR operation in the form of a logical flowchart. The steps represented in the flowchart could be implemented in the form of computer software (or other machine-language instructions) stored in computer readable memory on a device such as a hybrid AT, and executed by one or more processors of the device. By way of example, the example method will be considered as being implemented on a hybrid access terminal.

As shown in FIG. 5, the hybrid AT is initially engaged in an EVDO communication (501). For instance, the AT may have an active data session established according to the discussion of IS-856 above in connection with FIG. 2. At step 502, the AT receives the EVDO communication on the EVDO interface with both its primary (high-gain) and secondary (low-gain) antennas in combination. Evidently, the AT is not currently performing a tuneaway scan, since both antennas are receiving on the EVDO interface.

Reception of the EVDO communication by both antennas at step 502 may be considered as ongoing until occurrence of the next slot cycle. By way of example, the start of the AT's slot cycle processing is triggered at step 503 by expiration of a slot cycle timer 504. For instance, the AT can synchronize its slot cycle timer with its assigned slot cycles from the wireless communication system that transmits on control channels at the slot cycle frequency. Expiration of the slot cycle timer, represented by the dashed arrow from timer 504 to the step block 503, causes the AT "wake up" for 1X tuneaway operations. In accordance with the example embodiment, the AT resets its slot cycle time at step 505, as represented by the dashed arrow from step block 505 to timer 504, then proceeds to initiate a tuneaway scan at step 506. The slot cycle timer 504 reset at step 505 will expire again on the next slot cycle, thereby causing the process to repeat at the slot cycle frequency.

Upon initiation of the tuneaway scan (step 506), the AT determines at step 507 if the received 1X signal level during the previous tuneaway scan is below a threshold level. By way of example, the received 1X signal level from the previous tuneaway scan is obtained from signal-level memory 514. The dashed arrow from signal-level memory 514 to decision block 507 represents the retrieval of the previous scan's signal level. If the determination at step 507 is that the previous level is below the threshold level, then at step 508 the AT tunes its primary antenna to the 1X interfaced while keeping its secondary antenna tuned to the EVDO interface. This mode of operation is represented by antenna-receive sequences 404b and 406b in FIG. 4, for example. Advantageously, the hybrid AT is thus able to continue its EVDO communication without interruption by the tuneaway scan, even though the AT has bad 1X coverage (as indicated by the determination at step 507).

Since the AT will use it primary antenna for the 1X tuneaway scan and maintain EVDO communications with only it secondary antenna during the scan, it determines at step 509 if the current DRC request is greater than a threshold DRC value. If the current DRC request does exceed the threshold, then at step 510 the AT applies a DRC offset to the current DRC request, thereby decreasing the DRC request, as described above. At step 511, the AT then sends its reduced DRC request to the serving base station. If the current DRC request does not exceed the threshold, then the AT proceeds from step 509 directly to step 511, sending the current DRC request to the serving base station without first applying the DRC offset. Note that step 511 of sending the DRC request to the serving base station is not necessarily a different or additional DRC request beyond those that the AT sends as a matter of routine operation. However, application by the AT of the DRC offset as necessary (i.e., as determined at step 509) is part of the enhanced SHDR operation, and advantageously facilitates reliable reception of signals on the DO interface by the secondary antenna alone.

At step 512, the AT uses its primary antenna to scan the 1X paging channel on the 1X interface for a page message. This 1X tuneaway scan could additionally or alternatively search other 1X control channels besides just the particular paging channel assigned to the AT. During the scan, the AT measures the total signal level on the 1X interface (step 513). By way of example, the measured signal level is stored in the signal-level memory 514, as indicated by the dashed arrow from step block 513 to memory 514. The recorded value is then available to be used during the next slot cycle, as describe above in connection with decision step 507.

Once the tuneaway scan is complete (step 515), the AT retunes its primary antenna to the EVDO interface, and the process returns to the initial state describe by block 501. That is, the AT is engaged in the EVDO communication with both antennas tuned to the EVDO interface. The process then repeats the next time the slot cycle timer expires, as described above.

If at step 507 the AT determines that the previous 1X signal level is not below the threshold level, then at step 516 the AT tunes its secondary antenna to the 1X interfaced while keeping its primary antenna tuned to the EVDO interface. This mode of operation corresponds to what was referred to above as conventional SHDR mode, and is represented by antenna-receive sequences 404a and 406a in FIG. 4, for example. In this mode, the AT does not apply the DRC threshold test, since it is using its primary (high-gain) antenna to continue its EVDO communication. Instead, the AT proceeds directly to the scanning the 1X paging channel (and/or other 1X control channels) with its secondary antenna (step 517). At step 518, the AT measures the total signal level on the 1X interface, and again by way of example, stores the measured signal level in the signal-level memory 514, as indicated by the dashed arrow from step block 518 to memory 514. Once more, the recorded value is available to be used during the next slot cycle, as describe above in connection with decision step 507.

At step 519 the 1X tuneaway scan is complete, and the AT retunes its secondary antenna to the EVDO interface. The process then returns to the initial state describe by block 501. That is, the AT is again engaged in the EVDO communication with both antennas tuned to the EVDO interface. The process then repeats the next time the slot cycle timer expires, as described above.

It will be appreciated that flowchart in FIG. 5 depicts just one example of logical steps that may be used to carry out enhanced SHDR operation in a hybrid access terminal (or other similar device). It will be further appreciated that one or another of the steps could be modified, and that some steps could be carried out in a different order, while still achieving the described functionality of enhanced SHDR operation. For instance, the slot cycle timer could be reset after the tuneaway scan is complete. Moreover, the periodicity introduced by the time could be implemented by some other means.

b. Example Access Terminal

Figure 6:
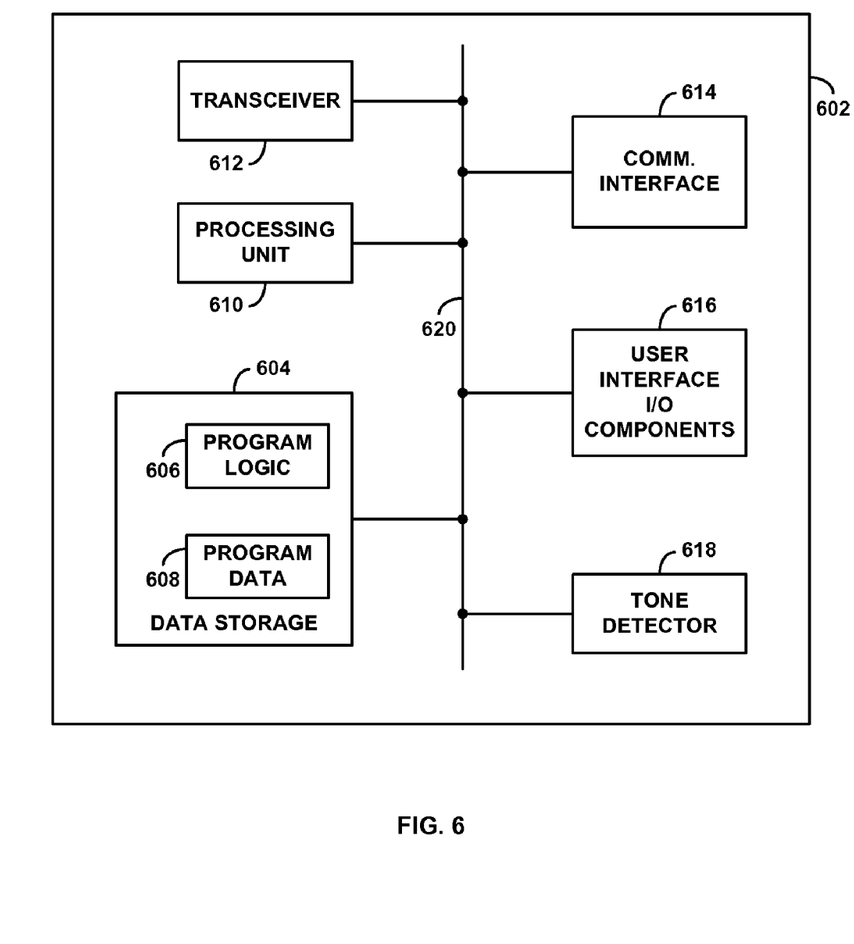
FIG. 6 is a block diagram of an example hybrid access terminal in which enhanced SHDR operation could be implemented.

FIG. 6 is a simplified block diagram depicting functional components of an example access terminal 602 in which enhanced SHDR operation may be implemented. The example AT 602 could be a cell phone, a personal digital assistant (PDA), a pager, a wired or wirelessly-equipped notebook computer, or any other sort of device capable of hybrid operation in a wireless communication system. As shown in FIG. 6, the example AT 602 includes data storage 604, processing unit 610, transceiver 612, communication interface 614, user-interface I/O components 616, and tone detector 618, all of which may be coupled together by a system bus 620 or other mechanism.

These components may be arranged to support conventional hybrid operation in a hybrid wireless communication network that is compliant with a CDMA family of protocols, such as network 200 illustrated in FIG. 2. The details of such an arrangement and how these components function to provide conventional operation are well-known in the art, and are not described further herein. Certain aspects of AT 602 relevant to enhanced SHDR operation are discussed briefly below.

Communication interface 614 in combination with transceiver 612, preferably includes a high-gain (primary) antenna and a low-gain (secondary) antenna and dual transmitter/receivers, and enables communication with the network, including the ability to transmit and receive signals on both a 1X and a DO interface. In particular, signal reception on the 1X interface supports 1X tuneaway scans, in addition to other 1X-based communications. Transmission and reception on the DO interface supports EVDO communication.

Processing unit 610 comprises one or more general-purpose processors (e.g., INTEL microprocessors) and/or one or more special-purpose processors (e.g., dedicated digital signal processor, application specific integrated circuit, etc.). Although not shown, processor 610 or related components may also include timer functionality, such as that described in connection with the slot cycle timer in FIG. 5. In turn, the data storage 604 comprises one or more volatile and/or non-volatile storage components, such as magnetic or optical memory or disk storage. Data storage 604 can be integrated in whole or in part with processing unit 610, as cache memory or registers for instance. In example AT 602, as shown, data storage 604 is configured to hold both program logic 606 and program data 608.

Program logic 606 may comprise storage of machine language instructions that define routines executable by processing unit 610 to carry out various functions described herein. In particular the program logic, communication interface, and transceiver may operate cooperatively to carry out logical operation such as that discussed above and illustrated in FIG. 5. Further, program data 608 may be arranged to store the measured 1X-RTT signal level, as described above in connection with the signal-level memory in FIG. 5.

It will be appreciated that there can be numerous specific implementations of enhanced SHDR operation in an access terminal, such AT 602 illustrated in FIG. 6. Further, one of skill in the art would understand how to devise and build such an implementation. As such, AT 602 is representative of means for carrying out enhanced SHDR operation in accordance with the methods and steps described herein by way of example.

6. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal having at least a first antenna and a second antenna, a method comprising:

using both the first antenna and the second antenna in combination to engage in a communication on a first air interface operating according to a first air interface protocol;

while engaging in the communication, using only one of the first antenna and the second antenna to engage in each of periodic intervals of scanning for one or more messages received on a second air interface operating according to a second air interface protocol;

prior to a next periodic interval, determining air interface quality on the second air interface; and using the determined air interface quality as a basis to decide whether or not to switch which one of the first antenna and the second antenna is used to engage in the scanning during the next periodic interval, wherein the first antenna has a higher gain than the second antenna, wherein determining air interface quality on the second air interface comprises making a determination of whether the air interface quality is below a threshold, and wherein using the determined air interface quality as a basis to decide whether or not to switch which one of the first antenna and the second antenna is used to engage in the scanning during the next periodic interval comprises (i) if the determined air interface quality is below the threshold, then selecting the first antenna for the scanning during the next periodic interval, and (ii) if the determined air interface quality is not below the threshold, then selecting the second antenna for the scanning during the next periodic interval.

2. The method of claim 1, wherein using both the first antenna and the second antenna in combination to engage in the communication comprises engaging in the communication with a base station, and wherein using only the one of the first antenna and the second antenna to engage in each of the periodic intervals of scanning comprises using the other antenna of the first antenna and the second antenna to continue to engage in the communication.

3. The method of claim 2, wherein using the other antenna of the first antenna and the second antenna to continue to engage in the communication comprises:

if the other antenna is the second antenna, then
upon determination that a data-rate request from the access terminal to the base station for data received on the first air interface is greater than a threshold data rate, sending a request to the base station for a reduced data rate for data received from the base station on the first air interface.

4. The method of claim 1, wherein the first air interface protocol is Evolution-Data Optimized (EVDO), EVDO being at least one of EVDO, Rel. 0, and EVDO Rev. A, and the second air interface protocol is 1X-RTT, 1X-RTT being at least one of 1X-RTT, Rel. 0, and 1X-RTT Rev. A, the access terminal is a hybrid access terminal, and the periodic intervals correspond to the access terminal's assigned slot cycles, and wherein the scanning for the one or more messages received on the second air interface comprises scanning the second air interface for a page message directed to the access terminal during one or more of the access terminal's assigned slot cycles.

5. The method of claim 1, wherein the next periodic interval is preceded by a current periodic interval, and wherein determining the air interface quality on the second air interface comprises determining the air interface quality on the second air interface during the current periodic interval.

6. The method of claim 5, wherein the first air interface protocol is Evolution-Data Optimized (EVDO), EVDO being at least one of EVDO, Rel. 0, and EVDO Rev. A, and the second air interface protocol is 1X-RTT, 1X-RTT being at least one of 1X-RTT, Rel. 0, and 1X-RTT Rev. A, and wherein determining the air interface quality on the second air interface during the current periodic interval comprises making a determination of whether a signal level received on the second air interface during the current periodic interval is below a threshold level.

7. The method of claim 6, wherein the first antenna has higher gain than the second antenna, and wherein using the determined air interface quality as a basis to decide whether or not to switch which one of the first antenna and the second antenna is used to engage in the scanning during the next periodic interval comprises:

selecting the first antenna for the scanning during the next periodic interval if the determined air interface quality is below the threshold level;

selecting the second antenna for the scanning during the next periodic interval if the determined air interface quality is not below the threshold level;

using the selected antenna to scan for the one or more messages on the second air interface in the next periodic interval; and using the other antenna to continue to engage in the communication on the first air interface during the next periodic interval.

8. The method of claim 7, wherein using the other antenna to continue to engage in the communication on the first air interface during the next periodic interval comprises:

if the other antenna is the second antenna, then
upon a determination that a current Data Rate Control (DRC) request is greater than a threshold DRC value, sending to the base station a DRC request that is reduced by a DRC Offset from the current DRC request.

9. The method of claim 1, wherein determining the air interface quality on the second air interface comprises predicting air interface quality on the second air interface prior to the next periodic interval based on measuring air interface quality on the second air interface prior to the next periodic interval.

10. In an access terminal that has at least a high-gain antenna and a low-gain antenna, a method comprising:

using both the high-gain antenna and the low-gain antenna in combination to receive wireless communications from a base station on a time-division multiple access interface;

while receiving in the wireless communications, using only one of the high-gain antenna and the low-gain antenna to engage in each of periodic intervals of scanning for a separate wireless communication received on a code-division multiple access interface;

prior to a next periodic interval, determining air interface quality on the code-division multiple access interface; and using the determined air interface quality as a basis to decide whether or not to switch which one of the high-gain antenna and the low-gain antenna is used to engage in the scanning during the next periodic interval, wherein determining air interface quality on the code-division multiple access interface comprises making a determination of whether a signal level received on the code-division multiple access interface is below a threshold level, and wherein using the determined air interface quality as a basis to decide whether or not to switch which one of the high-gain antenna and the low-gain antenna is used to engage in the scanning during the next periodic interval comprises (i) if the determination is that the signal level is below the threshold level, then selecting the high-gain antenna for the scanning during the next periodic interval, and (ii) if the determination is that the signal level is not below the threshold level, then selecting the low-gain antenna for the scanning during the next periodic interval.

11. The method of claim 10, wherein the access terminal is a hybrid access terminal, the periodic intervals correspond to the access terminal's assigned slot cycles, and the next periodic interval is preceded by a current periodic interval, wherein the time-division multiple access interface comprises an air interface configured to operate according to Evolution-Data Optimized (EVDO), EVDO being at least one of EVDO, Rel. 0, and EVDO Rev. A, wherein the code-division multiple access interface comprises an air interface configured to operate according to 1X-RTT, 1X-RTT being at least one of 1X-RTT, Rel. 0, and 1X-RTT Rev. A, and wherein determining the air interface quality on the code-division multiple access interface comprises predicting air interface quality on the code-division multiple access interface in the access terminal's next assigned slot cycle based on measuring air interface quality on the code-division multiple access interface during the access terminal's current assigned slot cycle.

12. The method of claim 11, wherein using only the one of the high-gain antenna and the low-gain antenna to engage in each of the periodic intervals of scanning comprises:

selecting only the one of the high-gain antenna and the low-gain antenna to engage in any given one of the periodic intervals of scanning;

using the selected antenna to scan for a page message on the code-division multiple access interface in the any given one of the periodic intervals; and using the other antenna to continue to receive the wireless communications on the time-division multiple access interface during the any given one of the periodic intervals.

13. The method of claim 12, wherein using the other antenna to continue to receive the wireless communications on the time-division multiple access interface during the any given one of the periodic intervals comprises:

if the other antenna is the low-gain antenna, then
upon a determination that a current Data Rate Control (DRC) request is greater than a threshold DRC value, sending to the base station a DRC request that is reduced by a DRC Offset from the current DRC request.

14. An access terminal comprising:
a high-gain antenna and a low-gain antenna;
means for using both the high-gain antenna and the low-gain antenna in combination to receive wireless communications from a base station on a time-division multiple access interface;
means for using only one of the high-gain antenna and the low-gain antenna to engage in each of periodic intervals of scanning for a separate wireless communication received on a code-division multiple access interface, while receiving the wireless communications on the time-division multiple access interface;

means for determining air interface quality on the code-division multiple access interface, prior to a next periodic interval; and means for using the determined air interface quality as a basis to decide whether or not to switch which one of the high-gain antenna and the low-gain antenna is used to engage in the scanning during the next periodic interval, wherein determining the air interface quality on the code-division multiple access interface comprises making a determination of whether a signal level received on the code-division multiple access interface is below a threshold level, and wherein using the determined air interface quality as a basis to decide whether or not to switch which one of the high-gain antenna and the low-gain antenna is used to engage in the scanning during the next periodic interval comprises (i) selecting the high-gain antenna level for the scanning during the next periodic interval if the determination is that the signal level is below the threshold, and (ii) selecting the low-gain antenna for the scanning during the next periodic interval if the determination is that the signal level is not below the threshold level.

15. The access terminal of claim 14, wherein the access terminal is a hybrid access terminal, the periodic intervals correspond to the access terminal's assigned slot cycles, and the next periodic interval is preceded by a current periodic interval, wherein the time-division multiple access interface comprises an air interface configured to operate according to Evolution-Data Optimized (EVDO), EVDO being at least one of EVDO, Rel. 0, and EVDO Rev. A, wherein the code-division multiple access interface comprises an air interface configured to operate according to 1X-RTT, 1X-RTT being at least one of 1X-RTT, Rel. 0, and 1X-RTT Rev. A, and wherein determining the air interface quality on the code-division multiple access interface comprises predicting air interface quality on the code-division multiple access interface in the access terminal's next assigned slot cycle based on measuring air interface quality on the code-division multiple access interface during the access terminal's current assigned slot cycle.

16. The access terminal of claim 15, wherein using only the one of the high-gain antenna and the low-gain antenna to engage in each of the periodic intervals of scanning comprises:

selecting only the one of the high-gain antenna and the low-gain antenna to engage in any given one of the periodic intervals of scanning;

using the selected antenna to scan for a page message on the code-division multiple access interface in the next periodic interval; and using the other antenna to continue to receive the wireless communications on the time-division multiple access interface during the any given one of the periodic intervals.

17. The access terminal of claim 16, wherein using the other antenna to continue to receive the wireless communications on the time-division multiple access interface during the any given one of the periodic intervals comprises:

if the other antenna is the low-gain antenna, then
upon a determination that a current Data Rate Control (DRC) request is greater than a threshold DRC value, sending to the base station a DRC request that is reduced by a DRC Offset from the current DRC request.

* * * * *